(12) United States Patent  
Rockwell

(10) Patent No.: US 6,536,466 B1
(45) Date of Patent: Mar. 25, 2003

(54) PRESSURE REGULATOR APPARATUS

(75) Inventor: Craig V. Rockwell, Minneapolis, MN (US)

(73) Assignee: Wanner Engineering, Minneapolis, MN (US)

( * ) Notice: Subject to any disclaimer, the term of this patent is extended or adjusted under 35 U.S.C. 154(b) by 0 days.

(21) Appl. No.: 09/148,398

(22) Filed: Sep. 4, 1998

(51) Int. Cl.$^7$ ............................................... F16K 31/12
(52) U.S. Cl. ...................................... 137/510; 137/505
(58) Field of Search ................................. 137/510, 509, 137/505.42, 505.49, 505; 251/335.2; 277/634, 641, 642

(56) References Cited

U.S. PATENT DOCUMENTS

| | | | | |
|---|---|---|---|---|
| 2,981,280 A | * | 4/1961 | Cornelius | 137/505.26 |
| 3,294,114 A | * | 12/1966 | Birkemeier | 137/510 |
| 3,982,559 A | * | 9/1976 | Ochs | |
| 4,742,845 A | * | 5/1988 | Capoccia et al. | 127/510 |
| 4,887,639 A | * | 12/1989 | Lewis et al. | |
| 4,942,899 A | * | 7/1990 | Vork et al. | |
| 5,070,901 A | * | 12/1991 | Black | |
| 5,107,887 A | * | 4/1992 | White et al. | |
| 5,176,176 A | * | 1/1993 | Lewis et al. | |
| 5,492,146 A | * | 2/1996 | George et al. | |
| 5,629,138 A | * | 3/1997 | Mutschler | 123/463 |
| 5,676,343 A | * | 10/1997 | Beeson | 251/61.3 |
| 5,755,254 A | * | 5/1998 | Carter et al. | 137/340 |
| 5,950,523 A | * | 9/1999 | Reynolds | 92/98 |
| 6,007,609 A | * | 12/1999 | Semerdjian et al. | 96/108 |

* cited by examiner

Primary Examiner—Gregory N. Huson
Assistant Examiner—Huyen Le
(74) Attorney, Agent, or Firm—Merchant & Gould P.C.

(57) ABSTRACT

A pressure regulator apparatus is provided which includes a regulator body having an inlet, an outlet and a passage communicating there between. The pressure regulator apparatus includes a valve disposed within the passage having a valve seat and a valve stem with one end of the valve stem biased toward the valve seat. The pressure regulator apparatus further includes a plunger member connected to the valve stem at an end opposite the valve seat with the plunger member movable axially with respect to the valve seat. The plunger member is further connected to a biasing member so that the plunger member biases the valve stem toward the valve seat to control the pressure of the fluid flowing through the pressure regulator. A flexible diaphragm is connected at an inner end between the valve stem and plunger member and connected at an outer end against the regulator body. The diaphragm is flexible as the plunger member and valve stem move axially with respect to the valve seat. Sealing members are disposed within a channel or groove in the valve stem and regulator body for engagement with the diaphragm to seal the passage of the regulator body. The cross-sectional area of the sealing members is less than the cross-sectional area of the channel in which the sealing members are disposed so that a portion of the diaphragm may extend into the channel when the diaphragm is under pressure to reduce movement of the diaphragm into the area between the regulator body and valve. Preferably, the diaphragm is compressed between the plunger member and the valve stem and against the regulator body in sufficient amount to retain the diaphragm in position and prevent leakage between the diaphragm and sealing members while minimizing the movement of diaphragm material into the non-compressed area between the valve and regulator body.

11 Claims, 6 Drawing Sheets

PRESSURE REGULATOR APPARATUS

BACKGROUND OF THE INVENTION

1. Field of the Invention

This invention relates generally to pressure regulators and more particularly to an improved pressure regulator utilizing a diaphragm.

2. Description of the Art

In the field of pressure regulators, it is known to utilize a plunger-type valve which includes radial seals (sliding seals) in the operation of the pressure regulator. Such a typical pressure regulator having sliding seals is illustrated in FIG. 8. One problem with such regulators is that when used in applications in which the fluid flowing through the regulator contains a high degree of particulate matter, for example, machine tool coolant, these regulators are prone to reduced valve life and poor operation. In particular, the suspended particles in the fluid wear on the sliding seals causing damage to the seals and subsequent leakage of fluid which then can contaminate other moving parts of the regulator as well as causing a loss of pressure. The contamination of the sliding seals due to the particulates in the fluid results in reduced regulator valve life and poor operating efficiency.

A different type of pressure regulator such as shown in U.S. Pat. No. 5,107,887, utilizes dual flexible diaphragms connected to the valve with sealing members positioned at the various points of connection of the diaphragm to the valve stem and regulator body. A problem with such regulators utilizing a diaphragm is that the flexible diaphragm has a tendency when under pressure to accumulate a significant portion of diaphragm material in the area between the valve stem and regulator body. This results in a thinner or reduced portion of diaphragm material at the hinge or connection positions of the valve stem and regulator body. The formation of increased portions of diaphragm material or "convolute" in the unclamped area results in thinning or "necking" of diaphragm material at the hinge positions and leads to reduced operational life of the diaphragm. This is especially apparent when the pressure regulator is used in applications requiring a high number of cycles of the valve. In these high cycle applications, the formation of a convolute in the unclamped area of the diaphragm significantly decreases the operational life of the valve, and inhibits the valve's ability to respond rapidly in a high speed cyclic application.

What is needed is a pressure regulator which provides consistent pressure regulation with improved regulator valve life and with improved operating efficiency. What is further needed is a pressure regulator apparatus capable of operating in an environment in which the pumping fluid contains a significant degree of particulates without reducing the regulator valve life. Such a pressure regulator should further be able to operate in a high speed cyclic application with improved regulator valve life while also protecting moving parts of the regulator from chemical or mechanically abrasive exposure of the pumped fluids.

SUMMARY OF THE INVENTION

The present invention provides a pressure regulator apparatus which demonstrates consistent pressure regulation with improved regulator valve life and with improved operating efficiency. Further, the pressure regulator apparatus provides for improved regulator valve life while operating in a high cycle application or in an environment in which the pumped fluid contains a high degree of particulates.

According to one aspect of the present invention, there is provided a pressure regulator apparatus which includes a regulator body having an inlet, an outlet and a passage communicating there between. The pressure regulator apparatus includes a valve disposed within the passage having a valve seat and a valve stem with one end of the valve stem biased toward the valve seat. The pressure regulator apparatus further includes a plunger member connected to the valve stem at an end opposite the valve seat with the plunger member movable axially with respect to the valve seat. The plunger member is further connected to a biasing member so that the plunger member biases the valve stem toward the valve seat to control the pressure of the fluid flowing through the pressure regulator. A flexible diaphragm is connected at an inner end between the valve stem and plunger member and connected at an outer end against the regulator body. The diaphragm is flexible as the plunger member and valve stem move axially with respect to the valve seat. Sealing members are disposed within a channel or groove in the valve stem and regulator body for engagement with the diaphragm to seal the passage of the regulator body. The cross-sectional area of the sealing members is less than the cross-sectional area of the channel in which the sealing members are disposed so that a portion of the diaphragm may extend into the channel when the diaphragm is under pressure to reduce movement of the diaphragm into the area between the regulator body and valve. According to one embodiment of the present invention, the sealing members comprise O-ring seals. In a preferred embodiment, the cross-sectional area of the O-ring seals are approximately 80–90 percent of the cross-sectional area of the channels in which the O-ring seals are disposed.

Pursuant to another embodiment of the invention, the diaphragm is compressed between the plunger member and the valve stem in sufficient amount to retain the diaphragm in position and prevent leakage between the diaphragm and sealing member while minimizing the movement of diaphragm material into the non-compressed area between the valve and regulator body. In one embodiment, the plunger member is secured to the valve stem such that the diaphragm is subject to between approximately 5–20 percent compression at the inner end of the diaphragm between the valve stem and plunger member. In a preferred embodiment, the diaphragm is subject to approximately 8–15 percent compression. Similarly, the outer end of the diaphragm is compressed between the regulator body and the diaphragm cover in sufficient amount to retain the diaphragm in position and prevent leakage between the diaphragm and sealing member while minimizing movement of the diaphragm into the non-compressed area between the valve and regulator body. In one embodiment, the diaphragm cover is secured against the regulator body such that the diaphragm is subject to between approximately 5–20 percent compression at the outer end of the diaphragm between the regulator body and diaphragm cover. In a preferred embodiment, the outer end of the diaphragm is subject to approximately 8–15 percent compression. Preferably, the connection of the diaphragm cover to the regulator body forms a cavity adjacent the outer end of the diaphragm such that upon compression of the diaphragm when the diaphragm cover is secured against the regulator body, a portion of the compressed diaphragm may move into the cavity adjacent the outer end of the diaphragm.

In accordance with another embodiment of the invention, the plunger member is disposed within the diaphragm cover for slidable movement therein. The plunger member preferably includes a self-sacrificial lubricating element, such as Teflon. The lubricating element is disposed within a groove formed on an outer surface of the plunger member such that the lubricating element contacts an adjacent surface of the diaphragm cover to provide lubrication between the plunger member and diaphragm cover. In a preferred embodiment, a plurality of lubricating elements are disposed in a plurality of grooves in the outer surface of the plunger member.

The above-described features and advantages, along with various other advantages and features of novelty, are pointed out with particularity in the claims of the present application which form a part hereof. However, for a better understanding of the invention, its advantages, and objects obtained by its use, reference should be made to the drawings which form a further part of the present application and to the accompanying descriptive matter in which there is illustrated and described preferred embodiments of the invention.

DETAILED DESCRIPTION OF THE INVENTION

Figure 1:
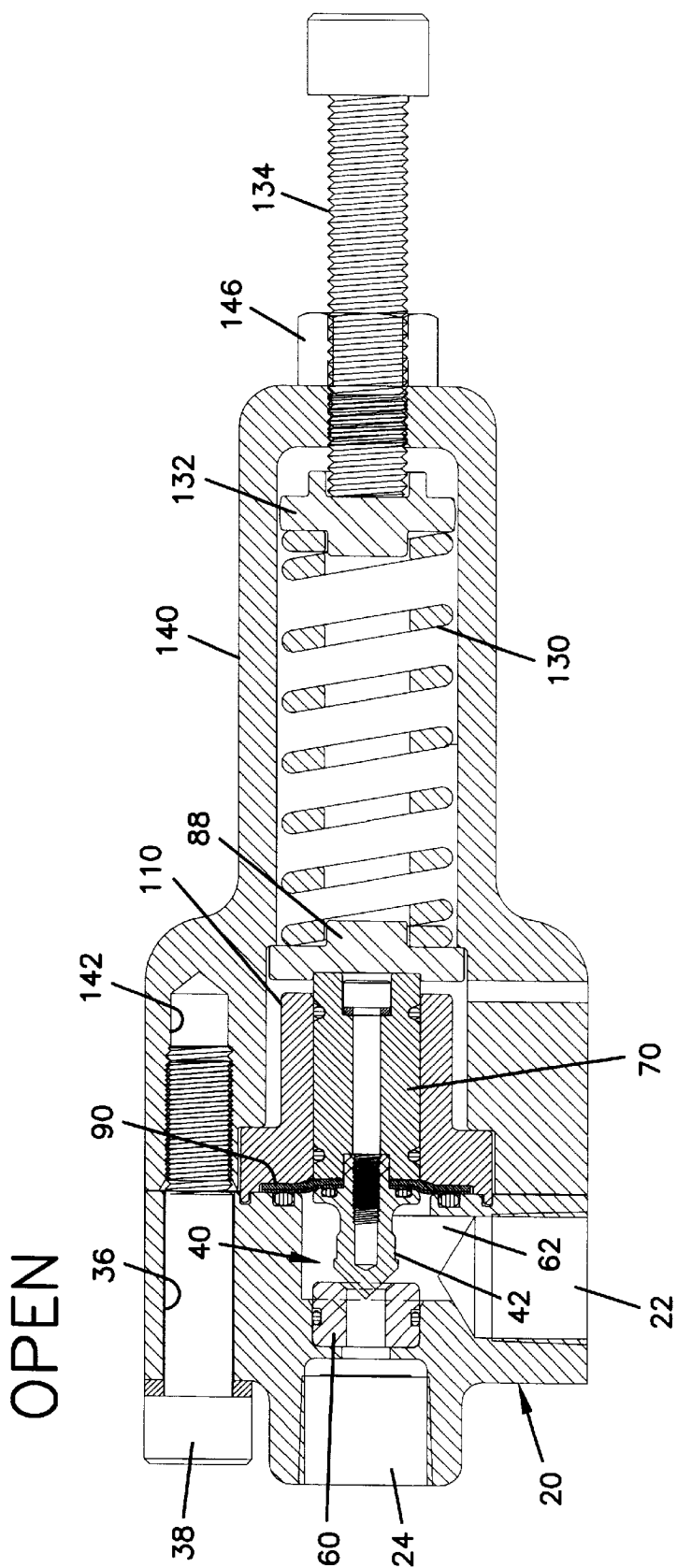
FIG. 1 is a cross-sectional side view of a pressure regulator apparatus according to the principles of the present invention with the valve shown in the open position.

Referring now to the drawings in which similar elements are numbered identically throughout, a description of preferred embodiments is provided. In FIG. 1, a cross-sectional side view of a pressure regulator apparatus is generally illustrated at 10.

Figure 7:
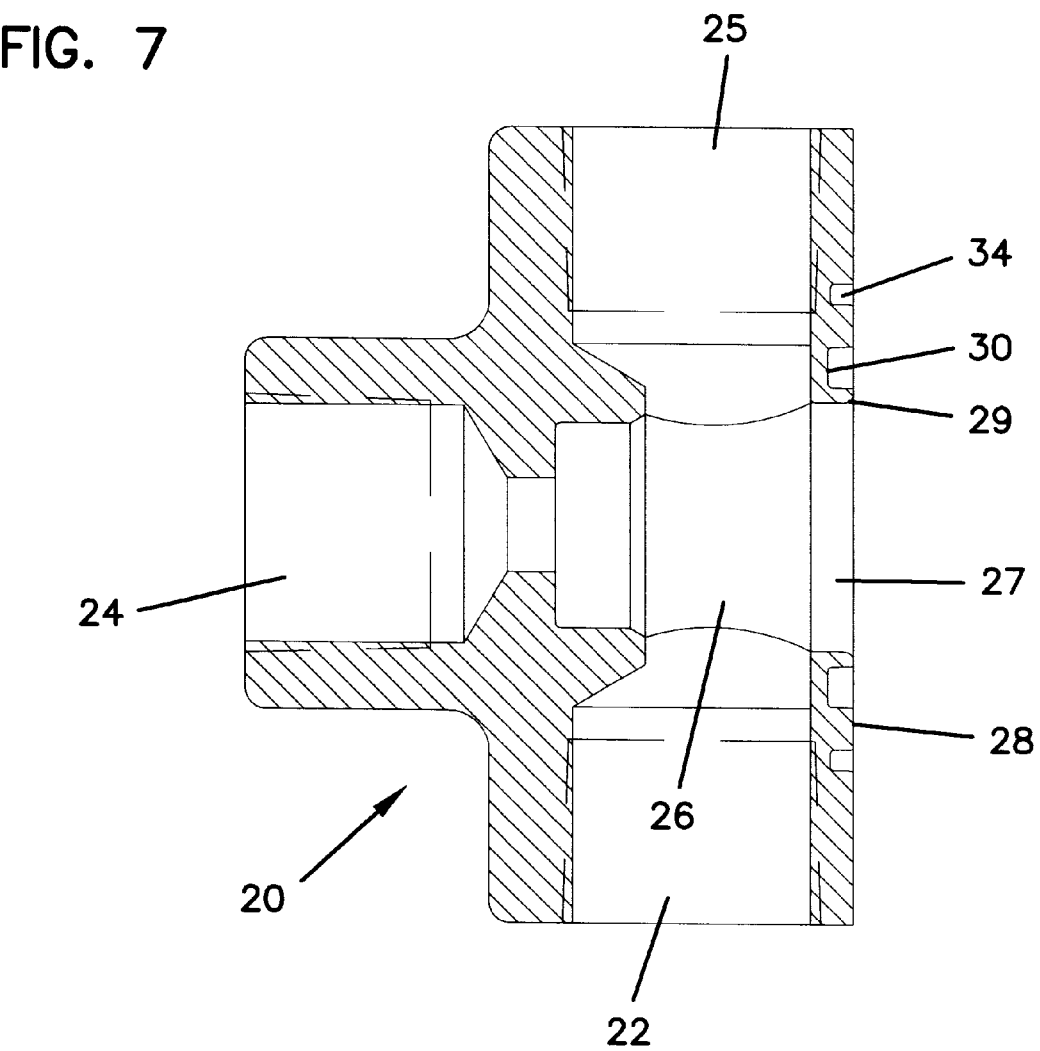
FIG. 7 is a cross-sectional view of the regulator body of the pressure regulator apparatus.

Referring to FIG. 1, the pressure regulator apparatus 10 includes a regulator body 20 having an inlet 22 and an outlet 24 which forms a passage 26 within the interior of the regulator body 20. The pressure regulator apparatus 20 includes a valve 40 disposed within the regulator body 20 for regulating the fluid pressure through the passage 26 of the regulator body 20. The valve 40 includes a valve stem 42 and a valve seat 60. The valve seat 60 is disposed within the interior of the regulator body 20 adjacent to passage 26 and includes a passage 62 to connect the passage 26 of the regulator body with the outlet 24. In one embodiment as shown in FIG. 7, the regulator body includes two outlets 24, 25, and the valve is disposed adjacent one of the outlets 24 to regulate the pressure of the fluid flowing through the regulator. For example, in such an application, the valve 40 is typically biased to the closed position and the fluid flows from inlet 22 through outlet 25. If the pressure of the fluid becomes too high, the valve opens and fluid is allowed to flow through outlet 24 as well outlet 25 which reduces the pressure of the fluid back to the predetermined level. It is appreciated that the present invention may be utilized with a variety of other different types of flow designs in pressure regulators. For example, the regulator body 20 could include a single inlet and single outlet (not shown) with the valve disposed therebetween to regulate the pressure of the fluid flowing through the regulator.

The valve 40 includes a valve stem 42 which is disposed for engagement against the valve seat 60 within the interior of the regulator body. In one embodiment, the valve stem 42 includes an engagement portion 44 which is disposed adjacent the valve seat 60 for an engagement with a corresponding beveled edge 64 of the valve seat 60. It is appreciated that numerous types of valve arrangements such as ball, poppet or needle may be utilized in accordance with the principles of the present invention. The valve stem 42 includes a base portion 46 which is connected to a plunger member 70. In preferred embodiment, the plunger member 70 includes an inner bore 86 which is axially aligned with a corresponding bore 56 in the base portion 46 of the valve stem 42 such that a cap screw 87 can be inserted through the inner bore 86 of the plunger member 70 to connect to the inner bore 56 of the valve stem such that the plunger member 70 and valve stem 46 are secured together. The plunger member 70 and valve stem 42 are disposed within an opening 27 in the regulator body 20 so that the valve stem extends into the passage 26 of the regulator body adjacent to the valve seat 60.

The regulator apparatus further includes a diaphragm 90 which is disposed across the opening 27 between the valve stem/plunger member assembly and the regulator body 20. In the preferred embodiment, the diaphragm 90 comprises a first diaphragm member 92 and a second diaphragm member 94. In one embodiment, the first diaphragm member 92 (or front diaphragm member) is made from a Teflon material with the second diaphragm member 94 (or rear diaphragm member) formed from a urethane material. In a preferred embodiment, the front diaphragm member is made from Guylon and the rear diaphragm member is made from a high durometer urethane. In this way, the first diaphragm member 92 of Teflon is exposed to the fluid flowing through the pressure regulator while the second diaphragm member 94 provides added flexibility and strength to the diaphragm. The diaphragm 90 is secured at its inner end 96 between the valve stem 42 and a base portion 72 of the plunger member 70. In a preferred embodiment, the valve stem 42 includes a flange portion 47 which includes a channel or groove 48 which contains a sealing member 50. The sealing member constitutes an O-ring seal preferably made from Teflon. It is appreciated that other materials may be utilized for the O-ring seal depending on the fluid flowing through the regulator. The inner end 96 of the diaphragm 90 is disposed between the base portion 72 of the plunger member 70 and the flange portion 47 of the valve stem 42.

According to one aspect of the present invention, the plunger member and valve stem are connected together such that the diaphragm member 90 is subject to a predetermined amount of compression between the valve stem and plunger member. The plunger member 70 preferably includes gripping ridges 74 formed on the base portion 72 of the plunger member 74 enhancing the engagement with the diaphragm 90. In one embodiment, the plunger includes a recess 82 including a shoulder 84 adapted for receiving the base portion 46 of the valve stem 42 therein. The shoulder 84 of the plunger member 70 engages the base 46 of the valve stem 42 such that the diaphragm 90 connected therebetween is subject to a predetermined amount of compression. In one embodiment, the valve stem and plunger member are dimensioned such that the connection of the two results in approximately 5–20% compression of the inner end 96 of the diaphragm 90 disposed therebetween. In a preferred embodiment, the inner end 96 of the diaphragm 90 is subject to 8–15% compression between the plunger member 70 and valve stem 42.

Figure 4:
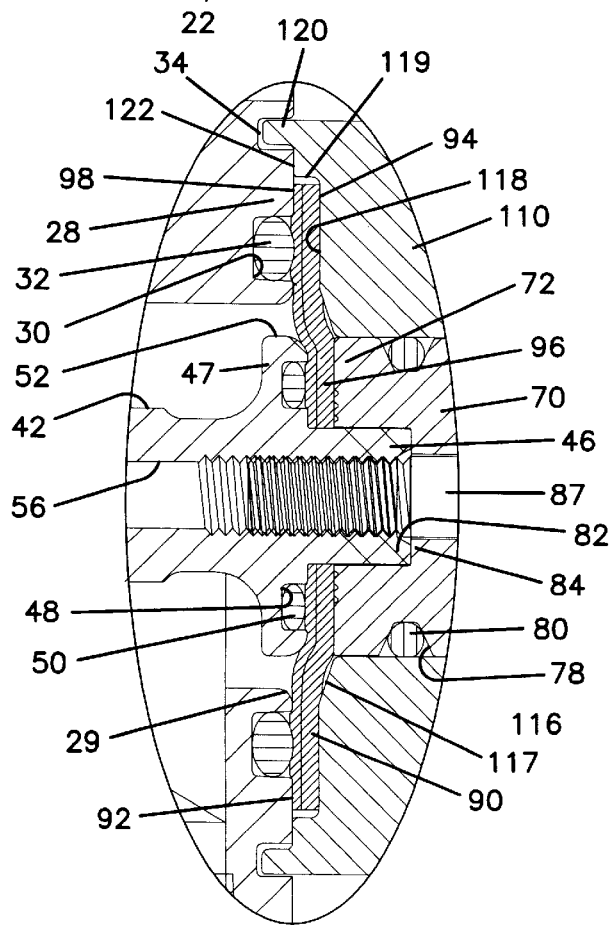
FIG. 4 is a partial cross-sectional view showing the diaphragm and adjacent components of the pressure regulator under pressure conditions with the valve shown in the open position.

It is appreciated that by dimensioning the plunger member 70 and valve stem 42 to subject the diaphragm 90 to a preset amount of compression, the diaphragm 90 is securely retained between the valve stem 42 and plunger member 70 and will not be compressed too much so that the inner end of the diaphragm moves significantly outward away from the connection point. According, the preset, controlled compression of the diaphragm prevents the movement of additional diaphragm material into the non-compressed area between the valve stem and regulator body as shown in FIG. 4. By not permitting the compression of the diaphragm to too great a degree, this helps improve the overall reliability of the diaphragm in operation as the diaphragm does not tend to thin or neck at the connection between the valve stem and plunger member 70 to form an enlarged convolute section within the non-compressed area between the valve stem 42 and regulator body 20. Further, by minimizing the convolute, the entire non-clamped area of the diaphragm and valve stem is available to react to changes in pressure.

According to another aspect of the present invention, the O-ring seal 50 which is disposed in the channel or groove 48 in the flange portion 47 of the valve stem 42 is preferably dimensioned such that the cross-sectional area of the O-ring seal 50 is less than the cross-sectional area of the channel 48 in which it is disposed. (See FIGS. 4, 6). It is noted that in assembly of the apparatus, the free (uncompressed) height of the sealing member is preferably 15–30% greater than the channel depth. In this way, it is appreciated that upon compression of the diaphragm between the plunger member 70 and valve stem 42, a portion of the diaphragm is permitted to move into the channel 48 that is not taken up by the O-ring seal 50 which reduces the amount of diaphragm material 90 which forms in the non-compressed area between the valve stem 42 and regulator body 20. This further helps reduce the formation of additional convolute in the non-compressed region which adds to the life expectancy of the diaphragm under operating conditions. In a preferred embodiment, the cross-sectional area of the O-ring seal is approximately 80–90% of the cross-sectional area of the channel 48 in which it is disposed. (see FIG. 4).

Figure 3:
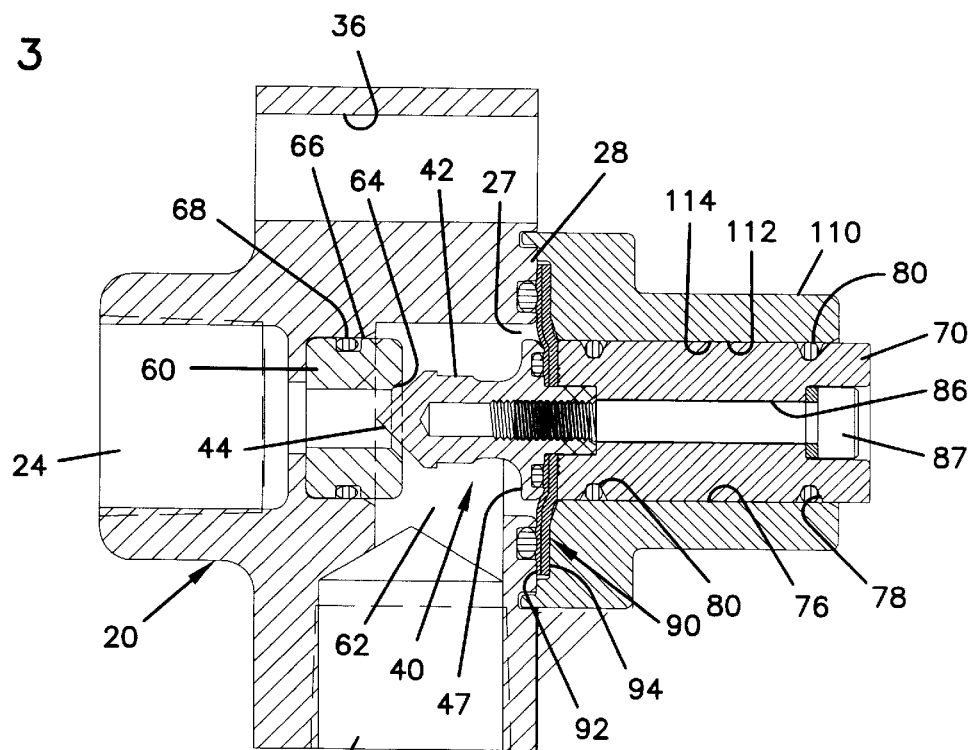
FIG. 3 is a cross sectional side view of a portion of the pressure regulator apparatus shown in FIG. 1.

The outer end 98 of the diaphragm 90 is similarly disposed for compression between the base 28 of the regulator body 20 and a diaphragm cover 110 which extends around the plunger member 70. Referring to FIGS. 3, 4 the base 28 of the regulator body 20 includes a channel or groove 30 which contains a sealing member or O-ring 32 for engagement with the diaphragm 90. The diaphragm cover 110 includes an inner cavity or bore 112 in which the plunger member 70 is disposed therein. The diaphragm cover 110 further includes a counter-bore or cavity 118 such that upon connection with the base 28 of the regulator body 20, the diaphragm 90 is compressed between the diaphragm cover 110 and base 28 of the regulator body 20. In a preferred embodiment, the regulator body 20 includes an annular channel 34 which receives a corresponding annular rim 120 of the diaphragm cover 110 for aiding in the connection of the two members. Referring to FIG. 4, the diaphragm cover includes an outer shoulder 122 which engages the base 28 of the regulator body 20 so that the amount of compression of the diaphragm 90 is controlled. In a preferred embodiment, the diaphragm 90 is subject to between 5–20% compression between the diaphragm cover 110 and regulator body 20. In a preferred embodiment, the connection of the diaphragm cover and regulator body results in 8–15% compression of the diaphragm 90. It is noted that this preset, controlled compression of the diaphragm prevents movement of significant diaphragm material into the non-compressed area between the valve stem 42 and regulator body 20 which improves the operational life expectancy of the diaphragm.

In a preferred embodiment, the cavity or counter-bore 118 of the diaphragm cover 110 includes an outer edge 119 which extends beyond the diaphragm 90. As shown in FIG. 4, this outer edge 119 of the cavity 118 allows room for the outer end 98 of the diaphragm 90 to expand into upon compression. This further helps eliminate movement of the diaphragm 90 into the non-compressed are between the regulator body 20 and valve stem 42 which improves the overall life expectancy of the diaphragm.

Similarly, the O-ring seal 32 which is disposed in the channel or groove 30 of the regulator body 20 is dimensioned such that it has a cross-sectional area which is less than the cross-sectional area of the channel 30 in which it is disposed. This allows movement of the diaphragm 90 into the channel when the diaphragm is compressed and the pressure regulator is under pressure which helps reduce the movement of diaphragm material into the convolute section or non-compressed area between the valve stem and regulator body. In a preferred embodiment, the cross-sectional area of the O-ring 32 is approximately 80–90% of the cross-sectional area of the channel of groove 30 in which it is disposed.

In a preferred embodiment, the edges of the valve stem and regulator body adjacent to diaphragm are formed with sufficient radii to reduce the build up of stress at these connection or hinge points. For example, in a preferred embodiment, the outer edge or rim 52 of the flange portion 47 of the valve stem 42 is rounded and includes a radius of such proportion that upon movement of the valve stem and plunger member axially forward or away from the valve stem, stress is reduced between the connection of the diaphragm and this outer edge 52 of the valve stem. Similarly, the inner edge 29 of the regulator body 20 adjacent to diaphragm 90 is similarly rounded and includes a radius sufficient to avoid build up of stress at this connection point. Accordingly, the diaphragm cover 110 similarly includes such relieved portion 117 and radius 116 to prevent the build up of stress against the diaphragm 90 during flexing of the diaphragm in response to reciprocal movement of the plunger member/valve stem assembly toward or away from the valve seat 60. The use of such radii on the regulator body and valve assembly reduces stretching of the convolute and further reduces "necking" at the point of compression between the diaphragm the regulator body and valve assembly.

Referring to FIGS. 3, 4 the plunger member 70 is disposed for slidable movement within an inner cavity or bore 112 of the diaphragm cover 110. Preferably, a tight clearance is maintained between the outer surface 76 of the plunger member 70 and the inner surface 114 of the diaphragm cover 110 which helps maintain alignment of the valve stem 42 and valve seat 60. The outer surface 76 of the plunger member 70 and the inner surface 114 of the diaphragm cover 110 preferably comprise smooth hard surfaces and a lubricating element 80 is introduced into the high contact stress areas between the plunger member 70 and diaphragm cover 110. The lubricating element 80 comprises an O-ring seal disposed in a corresponding groove 78 in the outer surface 76 of the plunger member 70. In a preferred embodiment, O-rings 80 are positioned at an upper and lower portion of the outer surface 76 of the plunger member 70 and are made from a self-lubricating material, such as Teflon. As the plunger member 70 slides within the diaphragm cover 110, the O-rings 80 contact the inner surface 114 of the diaphragm cover 110 and begin to slowly deteriorate. This spreads the O-ring material between the outer surface 76 of the plunger member 70 and inner surface 114 of the diaphragm cover 110 which thus serves as a lubricant to reduce friction and mechanical wear between the moving parts and increase the cycle life of the regulator.

Referring to FIG. 1, the plunger member 70 includes a plunger cap 88 which is connected to the plunger member opposite the valve stem 42. A spring 130 is disposed against the plunger cap 88 and a spring retainer member 132 is disposed adjacent the opposite end of the spring 130. A housing 140 is disposed around the valve stem/plunger member/diaphragm cover assembly for connection to the regulator body 20. As shown in FIG. 1, the spring is disposed in a cavity within the housing 140 such that an adjusting screw 134 extends through the housing and is connected to the spring retainer member 132. In this way, the adjusting screw 134 is used to adjust the tension in the spring 130 disposed against the plunger cap 88 which in turn controls the bias against the valve stem 42 to control the pressure of the fluid flowing through the pressure regulator. In a preferred embodiment, a locknut 146 is disposed at the top of the housing 140 to prevent total compression of the spring 130 and to maintain position of adjusting screw 134. The housing preferably includes a bore 142 which is aligned with a corresponding bore 36 in the regulator body 20. A bolt or screw 38 is thus inserted through the bore and the regulator body 20 to connect the regulator body to the housing 140.

In a preferred embodiment, the valve assembly is designed to maintain proper orientation with respect to the valve seat 60. As described above, this is accomplished in part by close tolerance match of the plunger member 70 and diaphragm cover 110 to position the valve stem/plunger member assembly on the central axis of the valve seat 60 and perpendicular to the valve seat. Additionally, the valve seat 60 is preferably positioned in the regulator body 20 with an O-ring seal 68 disposed in a corresponding groove 66 in the valve seat for engagement with the regulator body 20. The O-ring seal 68 provides for fluid sealing and further allows the valve seat 60 to seek its own center with respect to the valve stem 42 during operation under pressure conditions. In a preferred embodiment, the total travel distance of the valve stem 42/plunger member 70 through the open/closed cycle of the valve is limited such that it is less than the length of engagement of the valve stem 42 with the valve seat 60 and prevents overstretching of the diaphragm 90. This further helps in alignment of the valve and prevents binding of the plunger member while allowing the valve-to respond timely to changes in pressure.

Figure 2:
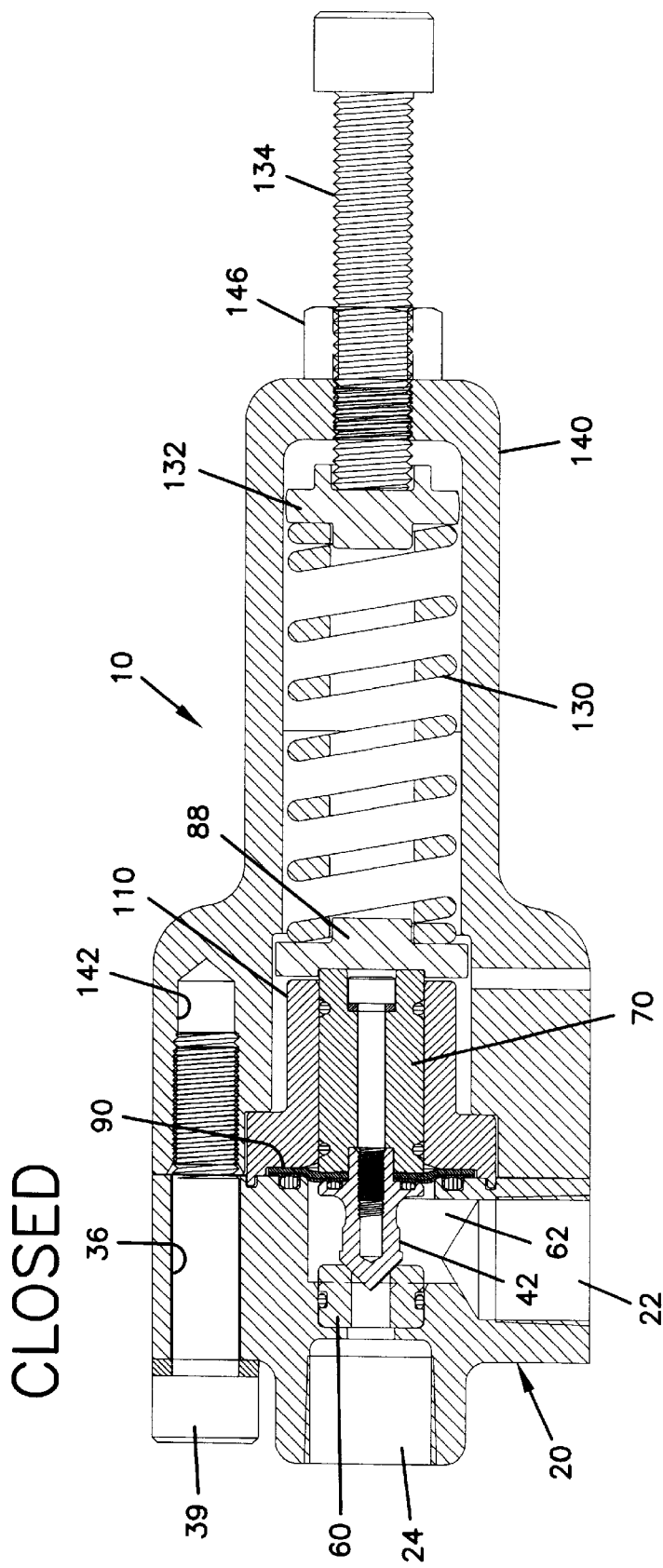
FIG. 2 is a cross-sectional side view of the pressure regulator apparatus as shown in FIG. 1 with the valve shown in the closed position.
Figure 5:
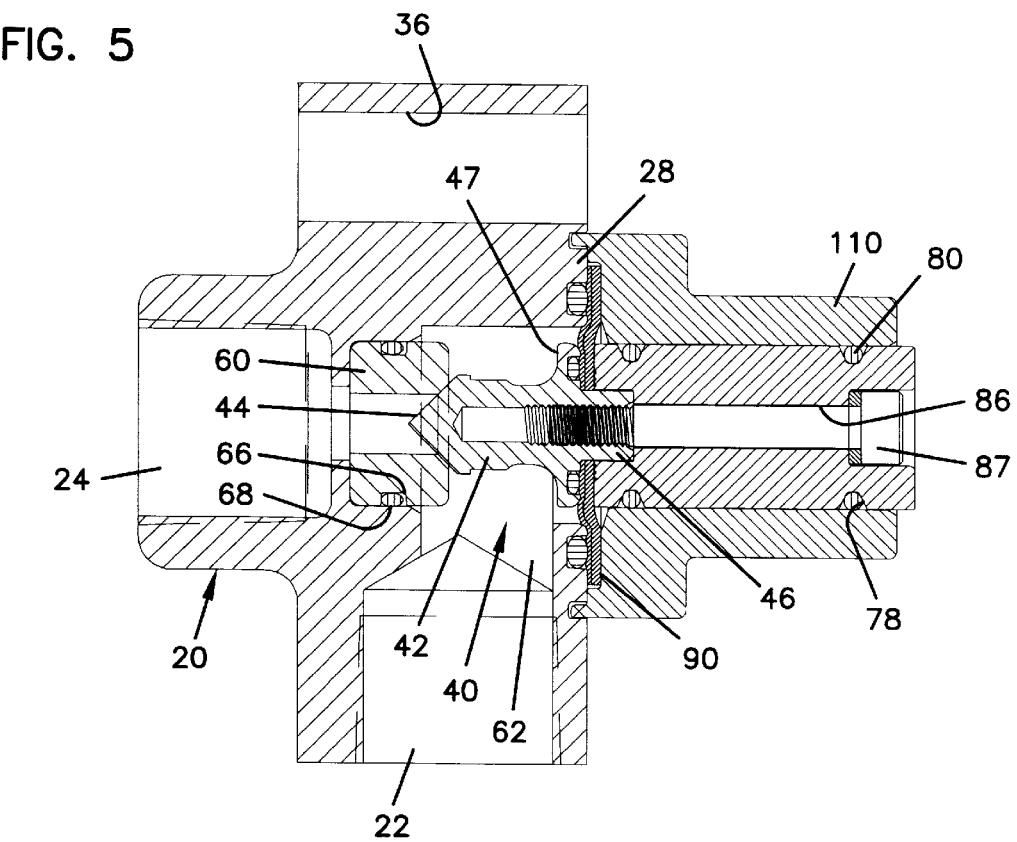
FIG. 5 is a cross-sectional side view of a portion of the pressure regulator apparatus shown in FIG. 2.

In the operation of a preferred embodiment of the present invention first the predetermined pressure is set through the adjustment of the adjustment screw 134 which varies the tension of the spring 130 against the plunger member 70. This sets the bias of the valve stem 42 toward the valve seat 60 which thus controls the pressure of the fluid to be regulated within the regulator body. In this example, as the fluid flows through the regulator body, the valve is initially close with the valve stem 42 against the valve seat 60 as shown in FIGS. 2 and 5. If the fluid pressure exceeds the preset pressure value, the fluid will exert a force against the diaphragm which exceeds the biasing force of the spring 130 and thus the valve stem 42/plunger member 70 assembly will be forced axially away from the valve seat 60 to the open position as shown in FIGS. 1 and 3. This allows the fluid to flow through the valve seat passage 62 to the outlet 24 which reduces the pressure in the regulator body 20. Once the fluid pressure falls to below the preset pressure, the spring 130 will force the plunger member/valve seat assembly back against the valve seat 60 and in this way the fluid pressure is maintained at the preset pressure. The movement of the valve from the closed to the open position constitutes a cycle. In a typical application, the valve may be subject to 30 cycles per second.

Figure 6:
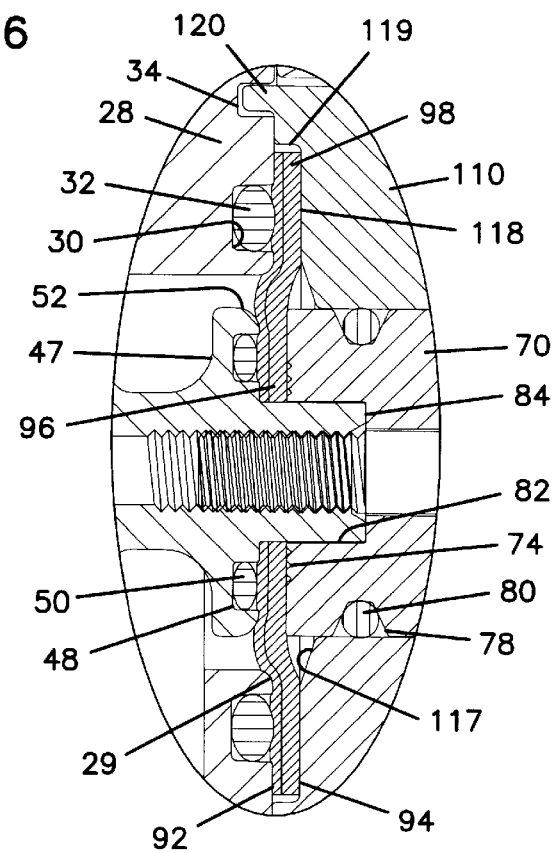
FIG. 6 is a partial cross-sectional side view showing the diaphragm and adjacent components of the pressure regulator apparatus under pressure conditions with the valve shown in the closed position.

In such a high speed cyclic application, the diaphragm flexes between the open and closed positions as shown in FIGS. 4, 6 and is subject to significant stress and wear. Due to the above-described features of the pressure regulator apparatus, the diaphragm of the present invention exhibits an increased operational life expectancy and improved operational efficiency. In particular, the diaphragm does not form an enlarged convolute of diaphragm material in the non-compressed area between the regulator body 20 and valve stem 42. This is due in part to the flow of diaphragm material into the channels 30, 48 containing the O-rings as shown in FIGS. 4,6. This minimizes any thinning or "necking" of the diaphragm at the compression points and the diaphragm is able to withstand a high number of cycles prior to failure. Additionally, the radii utilized at the various engagement points with the diaphragm reduce stress in the diaphragm during the valve cycles and reduce stretching of the convolute to further minimize "necking" at the point of compression. In a preferred operational embodiment, the total distance of travel of the valve assembly is limited to prolong diaphragm flex life. In one embodiment, the total travel of the diaphragm is limited to approximately 37% of the flex length of the diaphragm with 18.5% forward of the diaphragm neutral position and 18.5% behind the diaphragm neutral position.

Figure 8:
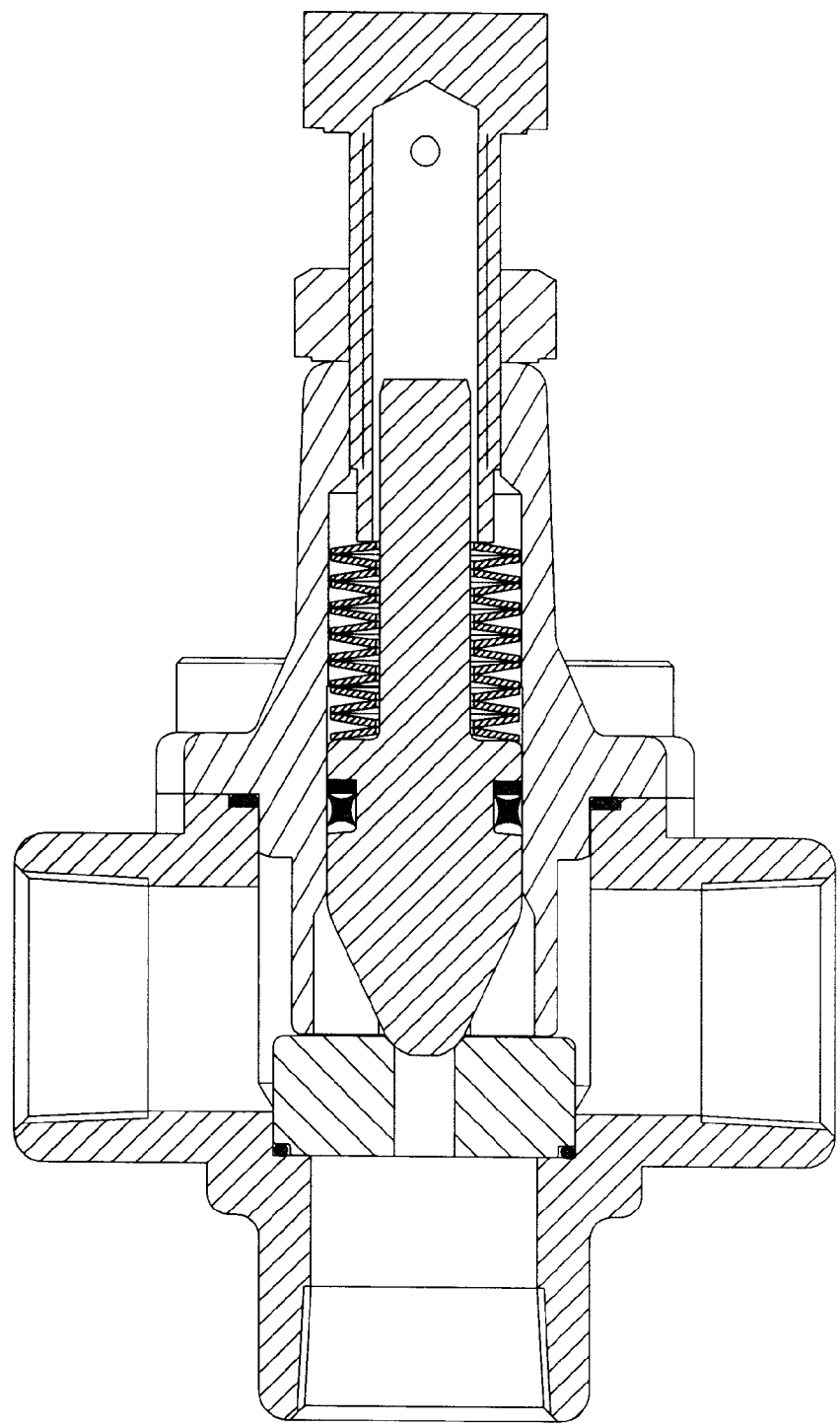
FIG. 8 is a cross-sectional side view of a prior pressure regulator having a sliding seal.

It is appreciated that the pressure regulator apparatus of the present invention which utilizes a diaphragm 90 in connection to the valve 40 further provides for superior operation under conditions in which the fluid contains particulate matter. As compared to prior sliding seal pressure regulators as shown in FIG. 8, the use of the diaphragm 90 which flexes in response to the reciprocal movement of the valve assembly 40 is less susceptible to contamination by particulate matter within the fluid. As the diaphragm 90 remains in contact with the sealing members or O-ring seals, 32, 50, as it flexes, it provides better sealing against particulates contained in the fluid than the sliding seals of prior regulators which are subject to significant deterioration if particulates from the fluid come in contact with the sliding seals as the seals move in conjunction with the valve assembly. Accordingly, the pressure regulator apparatus of the present invention displays improved regulator valve life and improved operating efficiency when operating in environments in which a high degree of particulate matter is contained within the fluid flowing through the regulator.

It is to be understood that even though numerous characteristics and advantages of various embodiments of the present invention have been set forth in the foregoing description, together with the details of the structure and function of various embodiments of the invention, this disclosure is illustrative only and changes may be made in a detailed, especially in matters of shape, size and arrangement of principles of the present invention, to the full extend indicated by the broad general meaning of the terms in which the appended claims are expressed.

Other modifications of the invention will be apparent to those skilled in the art in view of the foregoing descriptions. These descriptions are intended to provide specific examples of embodiments which clearly disclose the present invention. Accordingly, the invention is not limited to the described embodiment or to use of specific elements, dimensions, materials or configurations contained therein. All alternative modifications and variations of the present invention which fall within the spirit and broad scope of the appended claims are covered.

What is claimed is:

1. A pressure regulator apparatus comprising:

a regulator body having an inlet, an outlet, and a passage communicating therebetween;

a valve disposed within the passage having a valve seat and a valve stem with one end of the valve stem biased toward the valve seat; the valve stem including a base portion at an end opposite the valve seat;

a plunger member connected to the valve stem at the base portion, the plunger member movable axially with respect to the valve seat, the plunger member further connected to a biasing member wherein the plunger member biases the valve stem toward the valve seat to control the pressure within the passage of the regulator body; the plunger member defining a recess with a first shoulder;

a diaphragm cover adjacent to the regulator body; the diaphragm cover including an outer shoulder;

a flexible and compressible diaphragm connected at an inner end between the valve stem and plunger member and connected at an outer end against the regulator body with the diaphragm flexing as the plunger member and valve stem move axially with respect to the valve seat;
  (i) the plunger member first shoulder receiving and engaging the valve stem base portion to provide a first predetermined amount of compression of the diaphragm at the diaphragm inner end between and against the valve stem and the plunger member;
  (ii) the diaphragm cover outer shoulder engaging the regulator body to provide a second predetermined amount of compression of the diaphragm at the diaphragm outer end between and against the diaphragm cover and the regulator body; and sealing members disposed within corresponding channels in the valve stem and regulator body for engagement with the diaphragm to seal the passage in the regulator body;

wherein the cross-sectional area of the sealing members are less than the cross-sectional area of the channels in which the sealing members are disposed, such that a portion of the diaphragm may extend into the channel when the diaphragm is compressed to reduce movement of the diaphragm material into the area between the regulator body and valve.

2. The apparatus of claim 1 wherein the sealing members comprise O-ring seals, wherein the cross-sectional area of the O-ring seals are approximately 80–90 percent of the cross-sectional area of the channels in which the O-ring seals are disposed.

3. The apparatus of claim 1 wherein the inner end of the diaphragm is compressed between the plunger member and valve stem in sufficient amount to retain the diaphragm in position and prevent leakage between the diaphragm and sealing member disposed within the channel of the valve stem while minimizing movement of diaphragm material into the non-compressed area between the valve and regulator body.

4. The apparatus of claim 1 wherein the first predetermined amount of compression of the diaphragm at the diaphragm inner end between and against the valve stem and the plunger member is approximately 5–20 percent.

5. The apparatus of claim 1 wherein the outer end of the diaphragm is compressed between the regulator body and diaphragm cover in sufficient amount to retain the diaphragm in position and prevent leakage between the diaphragm and sealing member disposed within the channel of the regulator body while minimizing movement of the diaphragm into the non-compressed area between the valve and regulator body.

6. The apparatus of claim 1 wherein the second predetermined amount of compression of the diaphragm at the diaphragm outer end between and against the diaphragm cover and the regulator body is approximately 5–20 percent.

7. The apparatus of claim 6 wherein the connection of the diaphragm cover to the regulator body forms a cavity adjacent the outer end of the diaphragm such that upon compression of the diaphragm when the diaphragm cover is secured against the regulator body a portion of the compressed diaphragm may move into the cavity adjacent the outer end of the diaphragm.

8. The apparatus of claim 1 wherein the diaphragm constitutes first and second diaphragm members in overlay position with the first diaphragm composed of a fluorocarbon material and the second diaphragm member composed of a urethane material.

9. The apparatus of claim 5 wherein the plunger member is disposed within the diaphragm cover for slidable movement therein and the plunger member includes a lubricating element composed of a fluorocarbon material wherein the lubricating element is disposed within a groove formed on an outer surface of the plunger member such that the lubricating element contacts an adjacent surface of the diaphragm cover to provide lubrication between the plunger member and diaphragm cover.

10. A pressure regulator apparatus comprising:

a regulator body having an inlet, an outlet, and a passage communicating therebetween;

a valve disposed within the passage having a valve seat and a valve stem with one end of the valve stem biased toward the valve seat; the valve stem including a base portion at an end opposite the valve seat;

a plunger member connected to the valve stem at the base portion, the plunger member movable axially with respect to the valve seat, the plunger member further connected to a biasing member wherein the plunger member biases the valve stem toward the valve seat to control the pressure within the passage of the regulator body; the plunger member defining a recess with a first shoulder;

a diaphragm cover adjacent to the regulator body; the diaphragm cover including an outer shoulder;

a flexible and compressible diaphragm connected at an inner end between the valve stem and plunger member and connected at an outer end between the regulator body and the diaphragm cover with the diaphragm flexing as the plunger member and valve stem move axially with respect to the valve seat;

(i) the plunger member first shoulder receiving and engaging the valve stem base portion to provide a first predetermined amount of compression of the diaphragm at the diaphragm inner end between and against the valve stem and the plunger member;

(ii) the diaphragm cover outer shoulder engaging the regulator body to provide a second predetermined amount of compression of the diaphragm at the diaphragm outer end between and against the diaphragm cover and the regulator body; and sealing members disposed within corresponding channels in the valve stem and regulator body for engagement with the diaphragm to seal the passage in the regulator body;

wherein the diaphragm is compressed at its inner end between the plunger member and valve stem and at its outer end between the regulator body and diaphragm cover in sufficient amount to retain the diaphragm in position and prevent leakage between the diaphragm and sealing members while minimizing movement of diaphragm material into the non-compressed area between the valve and regulator body.

11. The apparatus of claim 10 wherein each of the first predetermined amount of compression of the diaphragm inner end and second predetermined amount of compression of the diaphragm outer end is approximately 5–20 percent.

* * * * *